(12) United States Patent
Woo et al.

(10) Patent No.: US 6,737,289 B2
(45) Date of Patent: May 18, 2004

(54) LIQUID CRYSTAL DISPLAY PANEL AND METHOD FOR FABRICATING THE SAME

(75) Inventors: Joung Won Woo, Kyonggi-do (KR); Woo Sup Shin, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 4 days.

(21) Appl. No.: 10/085,096

(22) Filed: Mar. 1, 2002

(65) Prior Publication Data

US 2002/0122143 A1 Sep. 5, 2002

(30) Foreign Application Priority Data

Mar. 2, 2001 (KR) .................. 10-2001-10775

(51) Int. Cl.⁷ .................. G02F 1/136; H01L 21/00
(52) U.S. Cl. .................. 438/30; 438/157; 349/46; 349/47; 349/153
(58) Field of Search .................. 349/42, 46, 47, 349/153; 438/29–30, 157, 158

(56) References Cited

U.S. PATENT DOCUMENTS

| 4,691,995 A | 9/1987 | Yamazaki et al. .......... 350/331 |
| 6,403,980 B1 * | 6/2002 | Park .................. 257/59 |
| 6,429,057 B1 * | 8/2002 | Hong et al. .................. 438/158 |

FOREIGN PATENT DOCUMENTS

| JP | 06-235925 | 8/1994 |
| JP | 08-101395 | 4/1996 |
| JP | 09-061829 | 3/1997 |
| JP | 10-177178 | 6/1998 |
| JP | 10-333157 | 12/1998 |
| JP | 10-333159 | 12/1998 |
| JP | 11-133438 | 5/1999 |
| JP | 11-142864 | 5/1999 |
| JP | 11-248930 | 9/1999 |
| JP | 11-326922 | 11/1999 |

* cited by examiner

*Primary Examiner*—James Phan
(74) *Attorney, Agent, or Firm*—Morgan, Lewis & Bockius LLP

(57) ABSTRACT

The present invention discloses an LCD panel and a method for fabricating the same. More specifically, the LCD panel includes first and second substrates, a photo-hardening sealant between the first and second substrates, a plurality of metal lines on the first substrate, wherein the metal lines are formed of a transparent conductive film at least at portions where the metal lines cross one another, and a liquid crystal layer between the first and second substrates. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

22 Claims, 7 Drawing Sheets

LIQUID CRYSTAL DISPLAY PANEL AND METHOD FOR FABRICATING THE SAME

This application claims the benefit of the Korean Application No. P2001-10775 filed on Mar. 2, 2001, which is hereby incorporated by reference.

BACKGROUND OF THE INVENTION

1. Field of the Invention

The present invention relates to a display, and more particularly, to a liquid crystal display panel and a method for fabricating the same. Although the present invention is suitable for a wide scope of applications, it is particularly suitable for improving adhesion between substrates.

2. Discussion of the Related Art

In general, a liquid crystal display (LCD) has two sheets of glass substrates and a liquid crystal layer sealed between the glass substrates, and a thin film transistor (TFT) is used as a switching device for switching a signal voltage to the liquid crystal layer.

Referring to FIG. 1, an LCD is a non-emission device provided with a lower glass substrate 1 having a TFT as a switching device formed thereon, an upper glass substrate 2 having a color filter formed thereon, and a liquid crystal 3 injected between the glass substrates 1 and 2, thereby obtaining an image by electro-optical characteristics of the liquid crystal 3. Since the LCD consumes a low power consumption and is portable, it draws a great attention as a next generation display which can replace a cathode ray tube (CRT).

More specifically, the lower glass substrate 1 has a TFT array 4, a pixel electrode 4a, and an orientation film 8 formed thereon, while the upper glass substrate 2 has a light shielding layer 5, a color filter layer 6, a common electrode 7, and the orientation film 8. The lower substrate 1 and the upper substrate 2 are bonded by a sealant 9, such as an epoxy resin. A driving circuit 11 on a PCB 10 is connected to the lower glass substrate 1 through a tape carrier package (TCP) 12 for generating and forwarding various control signals and signal voltages required for displaying an image on the LCD panel.

The sealant 9 is used for bonding and fixing the two sheets of glass substrates. In addition, it prevents external moisture from penetrating into the liquid crystal because the liquid crystal easily absorbs water. As a result, resistivity of the liquid crystal is lowered, and impurities may be formed therein when the liquid crystal is exposed to the air.

There are an inorganic sealant and an organic sealant. Although the inorganic sealant is used in the early generation LCD, the inorganic sealant is not used any longer as a liquid crystal material is developed. Among the organic sealants, there are epoxy group resins, phenol group resins, and acryl group resins, which may be sorted into two liquid types in which a main agent and a hardening agent are to be mixed in use, and one liquid type containing the main agent and the hardening agent as a single solution.

Depending on methods of hardening in the sealant, there are a thermo-hardening type, and a UV hardening type. Both types are required a strong adhesion, a high crystallinity, a good printability, and the like. Further, for accurately controlling a cell gap, a uniform spreading is necessary when the substrate is under pressing, heating, and curing processes.

The thermo-hardening resin, such as epoxy or phenol, has advantages of a high mechanical strength, a strong adhesion, and a good cross-linking. On the other hand, the UV hardening resin may be a better type in applying a larger sized device because it has a low hardening temperature, and a short hardening time period. Therefore, a thermal expansion problem may be avoided and bonding between the substrates is improved in applying to a large sized substrate.

A related art LCD panel will be explained with reference to the attached drawings. FIG. 2 illustrates a plane view of a related art LCD panel, wherein a first substrate 21 and a second substrate 21a are arranged to face into each other, and a liquid crystal layer (not shown) is formed between the first and second substrates 21 and 21a. Each of the first and second substrates 21 and 21a has an active region 'A' and a pad region 'P' defined thereon. The first substrate 21 has a plurality of thin film transistors and pixel electrodes on the active region 'A' and a plurality of gate pads 23 and data pads 25 on the pad region 'P'. There is a UV hardening sealant 27 in the pad region 'P' on the outside of the active region 'A', more specifically, on a pad link part PL, for bonding the first and second substrates 21 and 21a.

FIG. 3 illustrates a detailed view of an 'X' part of FIG. 2, wherein there are a plurality of gate lines G1, G2, . . . , Gn and data lines D1, D2, . . . , Dn formed in the active region 'A' on the first substrate 21. The gate lines and the data lines cross one another, thereby defining a plurality of pixel regions each having a pixel electrode 31. There are a TFT (not shown) arranged at each crossing part of the gate lines G1, G2, . . . , Gn and the data lines D1, D2, . . . , Dn.

There are gate pads GP1, GP2, . . . , GPn and data pads DP1, DP2, . . . , DPn, connected to a driving IC, for linking driving signals and data signals applied to the gate pads GP1, GP2, . . . , GPn and the data pads DP1, DP2, . . . , DPn to the gate lines G1, G2, . . . , Gn and data lines D1, D2, . . . , Dn at the active region 'A' through gate pad links PL__g, and data pad link PL__d, respectively.

Actually, the gate pads GP1, GP2, . . . , GPn and the data pads DP1, DP2, . . . , DPn are electrically connected to the TCP and anisotropic conductive film (ACF) by a transparent conductive film 33, for receiving the driving signals and the data signals from the external driving IC. The gate pads and the data pads are connected to the TCP and the ACF via the transparent conductive film 33 having a good electrical conductivity and good adhesion because the gate pads and the data pads formed of non-transparent metal have poor adhesion to the TCP and the ACF.

The aforementioned related art LCD panel will be explained in more detail. FIG. 4 illustrates a cross-sectional view along line IV—IV, showing the gate pads of the LCD panel.

Referring to FIG. 4, there are the gate line G1, the gate pad GP1, and the gate pad link PL__g formed on the first substrate 21 having the active region 'A' and the pad region 'P' defined thereon. The pad region 'P' has a region for the gate pad GP1 and a region for the gate pad link PL__g. A gate insulating film 41 is formed on the entire surface of the first substrate 21 including the gate pad GP1. There are a protection film 43 on the gate insulating film 41 and a transparent conductive film 33 passed through the gate insulating film 41 and the protection film 43, and electrically connected to the gate pad GP1.

The gate line G1, the gate pad link PL__g, and the gate pad GP1 are formed as a unit, formed of a non-transparent metal, such as aluminum (Al), chromium (Cr), molybdenum (Mo), copper (Cu), an aluminum alloy, a bilayer of the foregoing metals, or the like.

On the second substrate 21a at the active region 'A', there are a light shielding layer 45 extended to a region for the gate pad link PL_g, a color filter layer 47 for displaying colors, and a common electrode 49 and the pixel electrodes 31 (shown in FIG. 3) for applying a voltage to the liquid crystal LC. The photo-hardening sealant 27 along the outside of the active region 'A' having the gate pad link PL_g formed thereon, for bonding the first substrate 21 and the second substrate 21a.

In the meantime, there are thin film transistors and pixel electrodes (both not shown) on the first substrate 21 at the active region. That is, at a portion where the gate line and the data line are crossed, there are a thin film transistor having a gate electrode, a gate insulating film 41 on the gate electrode, a semiconductor layer and an ohmic contact layer on the gate insulating film 41, and a source and a drain electrodes, and a pixel electrode 31 connected to the drain electrode through the protection film 43.

FIG. 5 illustrates a cross-sectional view along line V—V of FIG. 3, in which reference symbol "DP1" denotes a data pad, "D1" denotes a data line, and "PL_d" denotes a data pad link. A detailed description of FIG. 5 will be omitted because FIG. 5 is similar to FIG. 4 except for that the data pad DP1 and the data line D1 are formed on the gate insulating film 41.

Thus, the foregoing LCD panel displays a picture as the thin film transistor is turned on/off in response to the gate signals and the data signals applied from the external driving IC to the gate lines G1, G2, . . . , Gn and the data lines D1, D2, . . . , Dn at the active region 'A' through the gate pads GP1, GP2, . . . , GPn and the data pads DP1, DP2, . . . , DPn.

However, the foregoing related art LCD panel has the following problems.

The plurality of pad links are formed of a non-transparent metal in the above-described LCD panel. Thus, when a photo-hardening sealant is applied for bonding the first substrate and the second substrate, a light shielding layer is extended to a portion of the pad link on the second substrate, so that UV light for curing the sealant is blocked by the portion. As a result, bonding of the two substrates becomes defective, and a product reliability becomes poor.

Because of the small margin of the light shielding layer and the pads, the photo-hardening sealant is used to product models for monitors only. The photo-hardening sealant should be applied to the circumference of the optical shield layer because the pads are formed of non-transparent metal. The photo-hardening sealant may be applied to large sized product monitors only. In the case of fabricating monitors, since the light shielding layer is exposed to a region for which the photo-hardening sealant is to be coated, light is directed to a color filter substrate, thereby curing the sealant. However, in the case of the notebook PC, there is no room for opening in the light shielding layer due to a small margin.

SUMMARY OF THE INVENTION

Accordingly, the present invention is directed to a liquid crystal display panel and a method for fabricating the same that substantially obviate one or more of problems due to limitations and disadvantages of the related art.

Another object of the present invention is to provide a liquid crystal display panel and a method for fabricating the same, which can solve the problem of defective bonding of the two substrates, thereby improving a product reliability.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD panel includes first and second substrates, a photo-hardening sealant between the first and second substrates, a plurality of metal lines on the first substrate, wherein the metal lines are formed of a transparent conductive film at least at portions where the metal lines cross one another, and a liquid crystal layer between the first substrate and the second substrate.

In another aspect of the present invention, an LCD panel includes first and second substrates each having an active region and a pad region thereon, a photo-hardening sealant along a boundary between the active region and the pad region, a plurality of pads formed in the pad region, a plurality of lines arranged to cross one another in the active region, a plurality of pad links formed of a transparent conductive film connecting the pads and the lines, and a liquid crystal layer between the first and second substrates.

In another aspect of the present invention, a method for fabricating an LCD panel having an active region on a first substrate and first and second pad regions on a second substrate includes forming a plurality of gate lines at the active region and a plurality of gate pads at the first pad region, forming a plurality of data lines at the active region between the gate lines and the gate pads and a plurality of data pads in the second pad region, forming a plurality of pad links formed of a transparent conductive material connected between the gate lines and the gate pads, and the data lines and the data lines, and attaching the first and second substrates.

The LCD panel of the present invention is characterized in that an optical path is provided so that a light can be incident on a photo-hardening sealant applied for bonding the first and second substrates.

In realizing an embodiment, pads and pad links connecting the pads and wiring are formed of a transparent conductive material that transmits the light. Alternatively, at least a part of the pad links the photo-hardening sealant is formed of the transparent conductive material. Thus, light is permitted to pass the transparent conductive material and cure the photo-hardening sealant.

Accordingly, a product reliability is improved because the photo-hardening sealant is effectively cured, thereby improving bonding of the two substrates by eliminating defective bonding.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
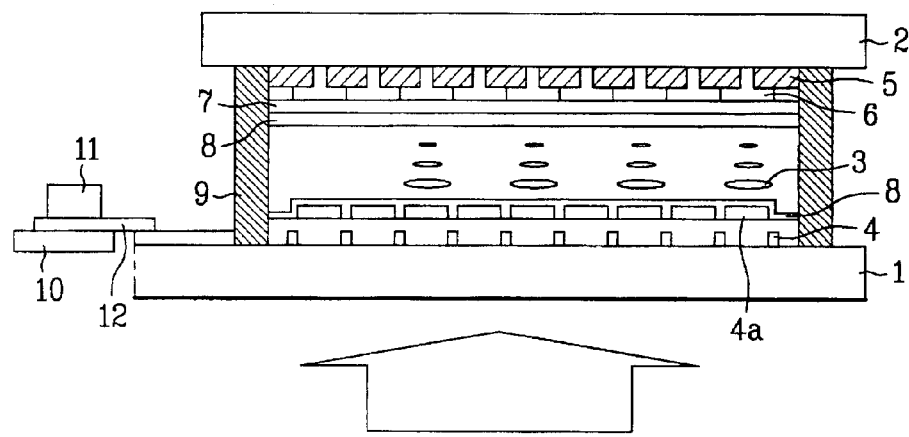
FIG. 1 illustrates a cross-sectional view of a related art LCD panel.
Figure 2:
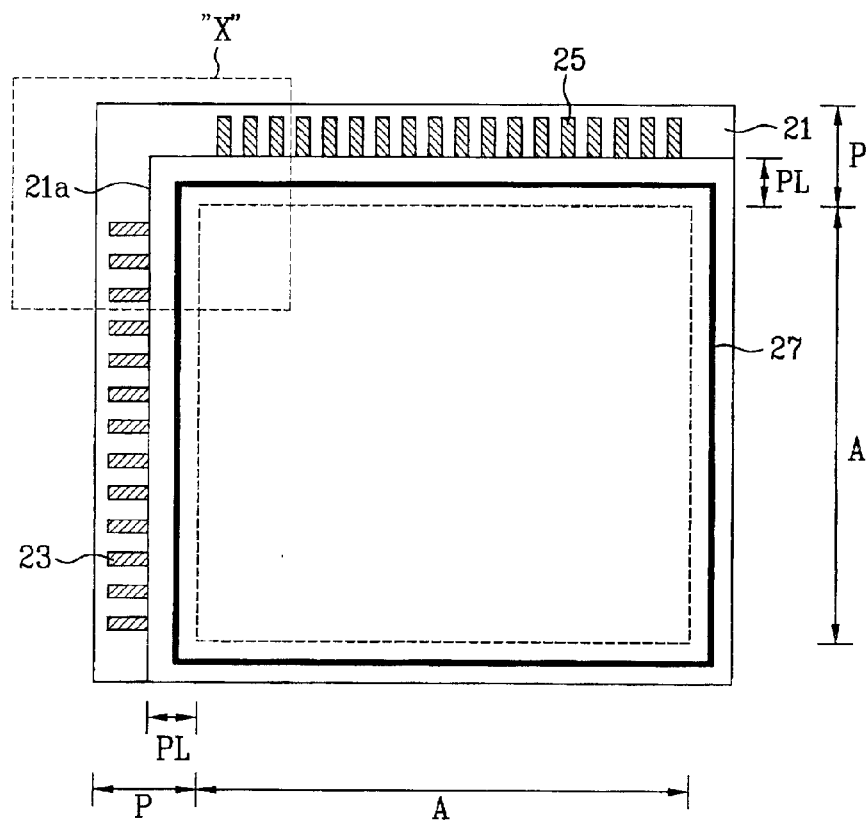
FIG. 2 illustrates a plane view of the related art LCD panel.
Figure 3:
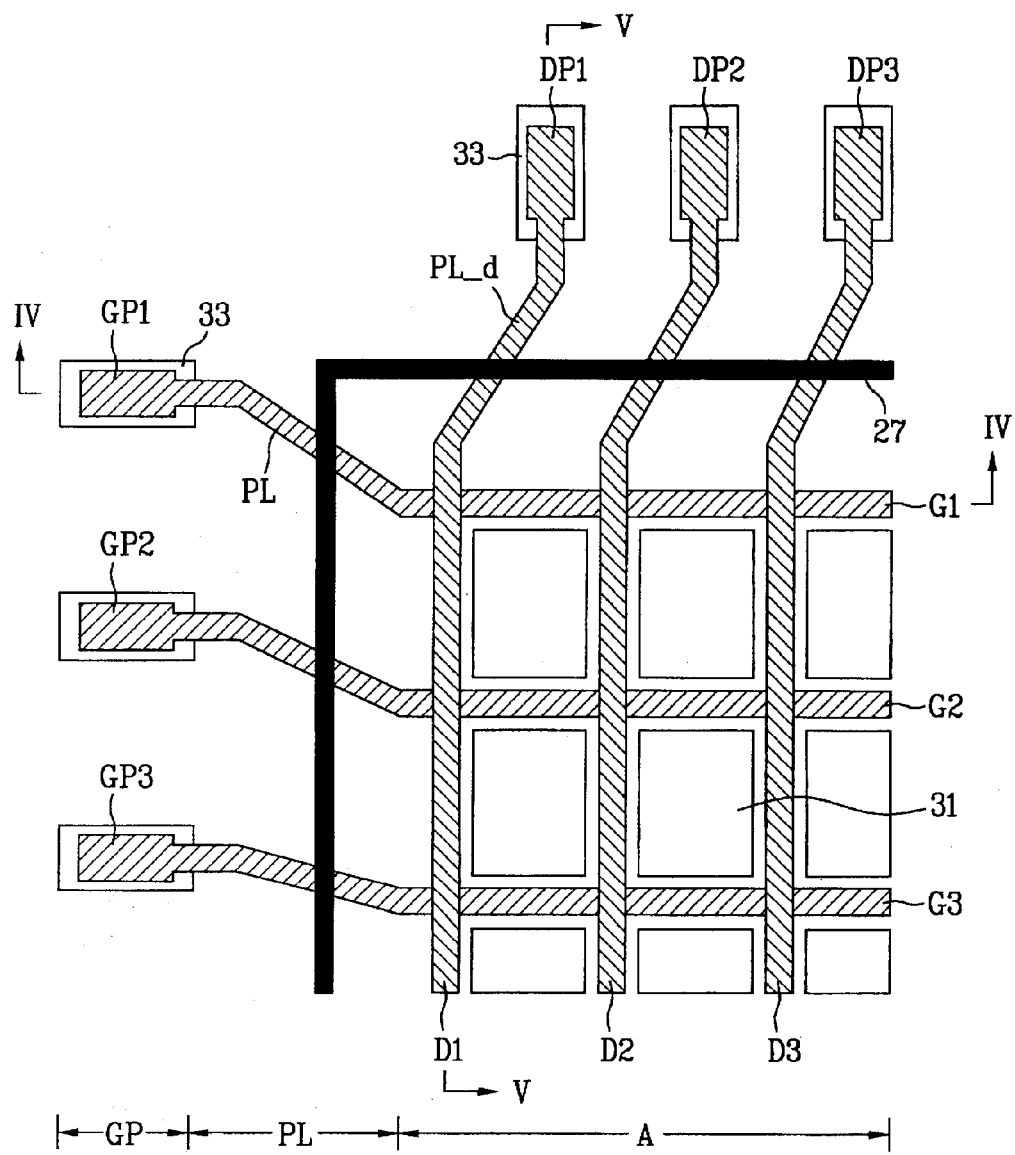
FIG. 3 illustrates a detailed view of an 'X' part in FIG. 2.
Figure 4:
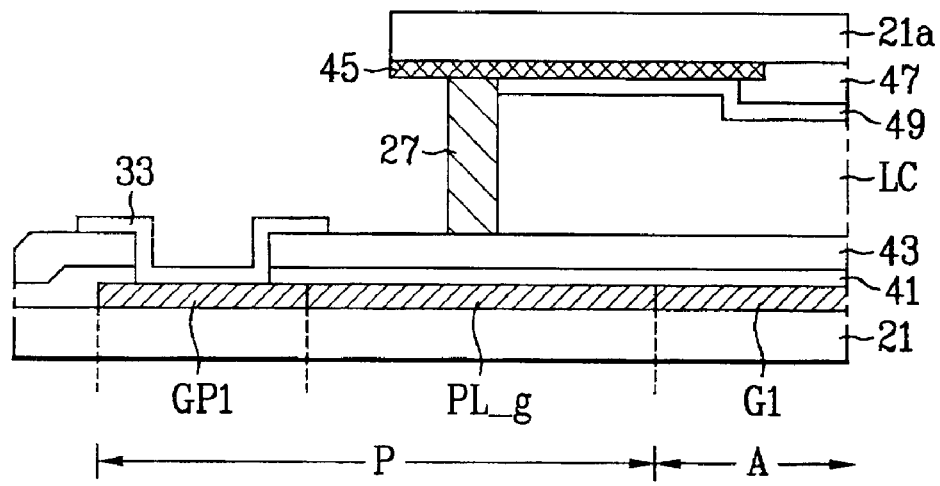
FIG. 4 illustrates a cross-sectional view along line VI—VI of FIG. 3.
Figure 5:
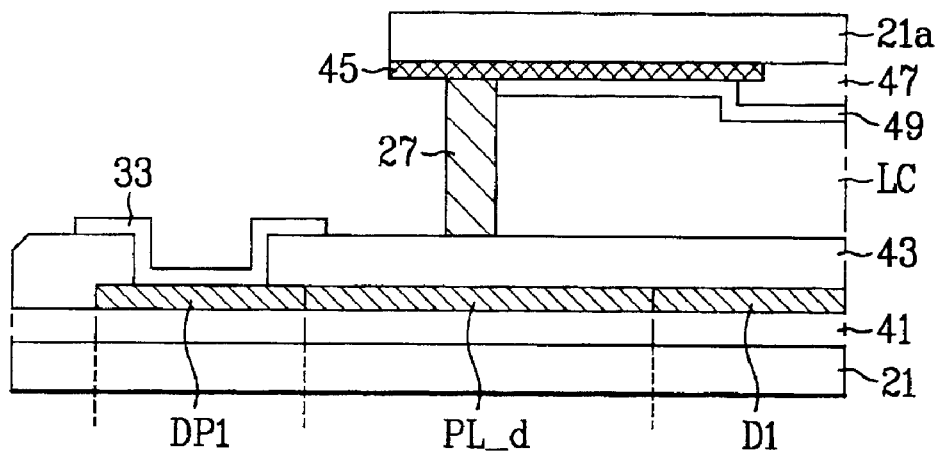
FIG. 5 illustrates a cross-sectional view along line V—V of FIG. 3.
Figure 6:
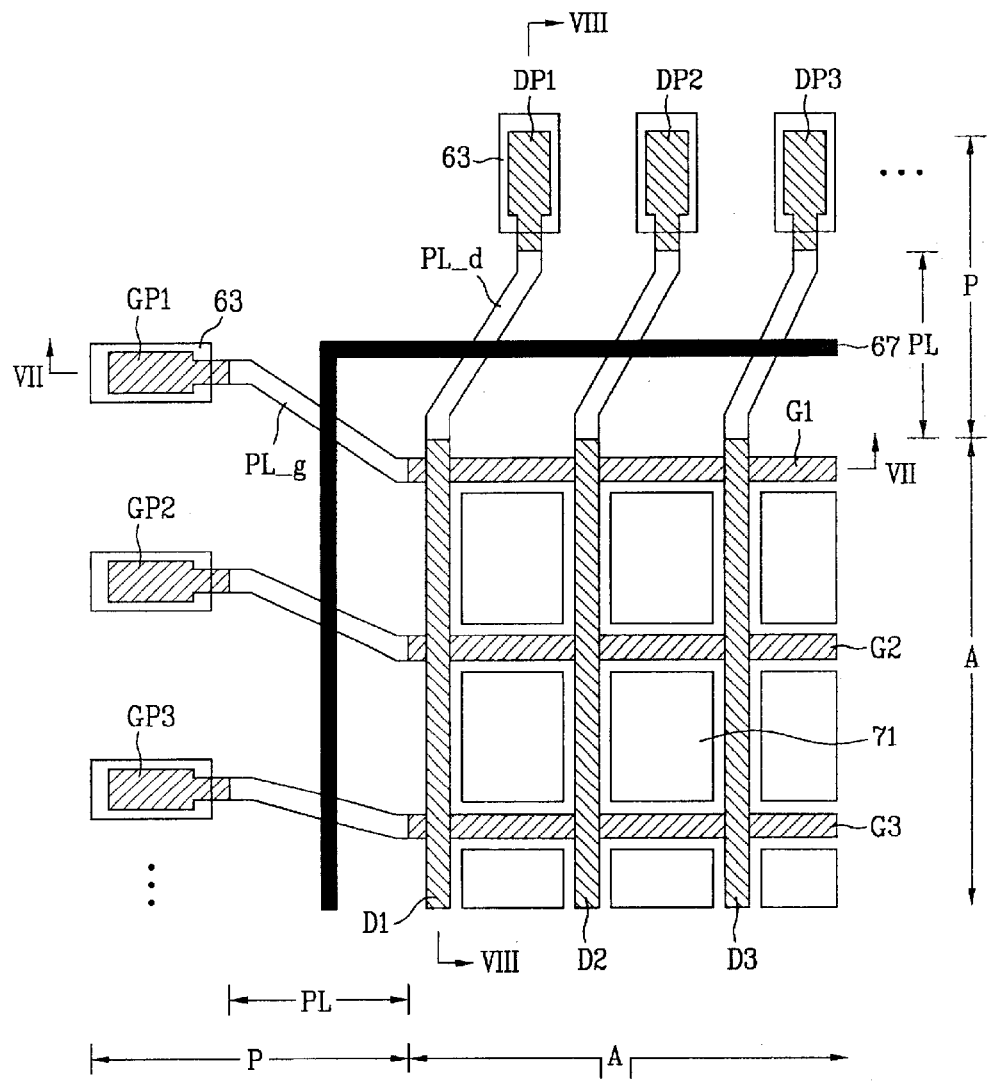
FIG. 6 illustrates a plane view of an LCD panel according to the present invention.

Referring to FIG. 6, an LCD panel includes a plurality of gate lines G1, G2, . . . , Gn and data lines D1, D2, . . . , Dn at an active region 'A' crossing one another, thereby defining a plurality of pixel regions each having a pixel electrode 71.

There is a pad region P having a plurality of gate pads GP1, GP2, . . . , GPn connected to an external driving IC (not shown), a plurality of gate pad links PL_g formed of a transparent conductive material connected to the gate lines G1, G2, . . . , Gn and the gate pads GP1, GP2 . . . , GPn, respectively, and a plurality of data pad links PL_d formed of a transparent conductive material connected to the data lines D1, D2, . . . , Dn and the data pads DP1, DP2, . . . , DPn, respectively.

There is a UV hardening sealant 67 applied to a pad link part PL having pad links PL_g and PL_d formed of a transparent material along a circumference of the active region 'A', for bonding a first substrate 61 and a second substrate 61a.

The gate lines G1, G2, . . . , Gn, the data lines D1, D2, . . . , ba Dn, the gate pads GP1, GP2, . . . , GPn, and the data pads DP1, DP2, . . . , DPn are formed of a non-transparent metal selected from one of aluminum (Al), chromium (Cr), molybdenum (Mo), copper (Cu), an aluminum alloy, a bilayer of the foregoing metals, and the like. The gate and data pad links PL_g and PL_d are formed of a transparent conductive material, such as indium tin oxide (ITO), and the like. Alternatively, only portions of the gate and date pad links PL_q and PL_d where the gate lines and data lines cross one another may be formed of a transparent conductive material.

The gate pads GP1, GP2, . . . , GPn and the data pads DP1, DP2, . . . , DPn for forwarding the gate driving signals and the data signals from the external driving IC through a TCP and a ACF have poor adhesion to the TCP and the ACF because they are formed of a non-transparent metal. Therefore, a transparent conductive film 63 having a good electrical conductivity and adhesion is formed between the gate pads GP1, GP2, . . . , GPn and the data pads DP1, DP2, . . . , DPn and the TCP and the ACF, when the gate and data pad links PL_g and PL_d are formed.

Figure 7:
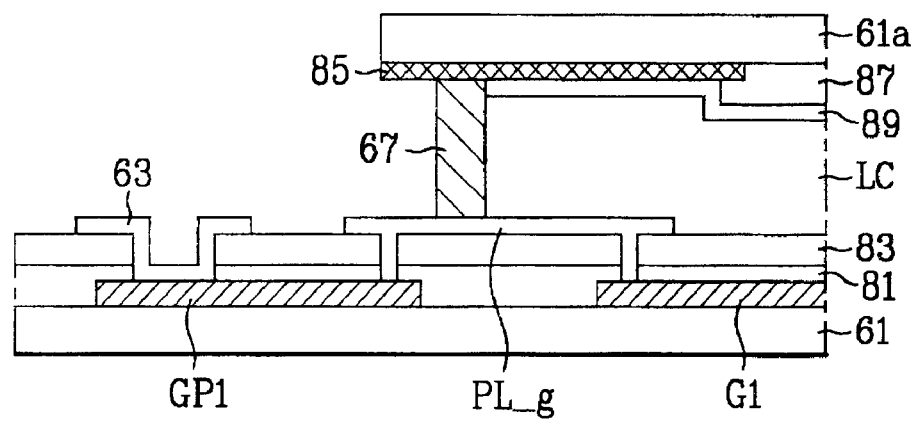
FIG. 7 illustrates a cross-sectional view along line VII—VII of FIG. 6.

FIG. 7 illustrates a cross-sectional view along line VII—VII of FIG. 6 showing the gate pad.

Referring to FIG. 7, there are the gate line G1, and the gate pad GP1 formed on the first substrate 61 having an active region 'A' and a pad region 'P'. The pad region 'P' has a region for forming the gate pad and a region for forming the gate pad link. Further, a gate insulating film 81 is formed on the entire surface of the first substrate 61 inclusive of the gate pad GP1 and the gate line G1. There are a protection film 83 on the gate insulating film 81 and a transparent conductive film 63. The gate pad link PL_g is formed of a transparent conductive material contacting the gate pad GP1 and the gate line G1 through a connection hole in the protection film 83 and the gate insulating film 81.

The gate line G1 and the gate pad GP1 are formed of a non-transparent metal, such as aluminum (Al), chromium (Cr), molybdenum (Mo), copper (Cu), an aluminum alloy, or a bilayer of the foregoing metals.

There are a semiconductor layer (not shown) on the gate insulating film 81 at the active region 'A' and a source electrode and a drain electrode of the thin film transistor in the semiconductor layer. There is a pixel electrode 71 on the protection film 83 connected to the drain electrode through the connection hole.

In the meantime, on the second substrate 61a at the active region 'A', there are a light shielding layer 85 extended to a region for the gate pad link PL_g preventing light from transmitting to regions other than the pixel electrodes on the first substrate 61, a plurality of color filter layers 87 for displaying colors, and a common electrode 89 with the pixel electrodes 61 for applying a voltage to the liquid crystal layer LC. There is photo-hardening sealant 67 between the gate pad link PL_g on the first substrate 61 and the light shielding layer 85 on the second substrate 61a, for bonding the first substrate 61 and the second substrate 61a.

According to the LCD panel of the present invention, when the photo-hardening sealant 67 is used as a sealing material for bonding the first substrate 61 and the second substrate 61a, light is incident on the photo-hardening sealant 67 through the pad links PL_g and PL_d formed of a transparent conductive material. Thus, portions of the photo-hardening sealant 67 overlapping the pad links PL_g and PL_d are more effectively cured, thereby improving bonding between the first and second substrates 60 and 61a and a product reliability.

Figure 8:
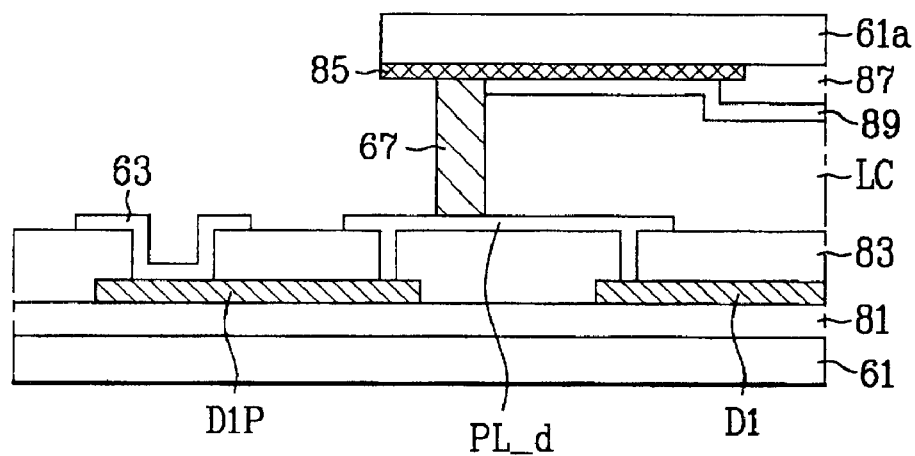
FIG. 8 illustrates a cross-sectional view along line VIII—VIII of FIG. 6.

In the meantime, FIG. 8 illustrates a cross-sectional view along line VIII—VIII of FIG. 6, in which reference symbol "DP1" denotes a data pad, "D1" denotes a data line, and "PL_d" denotes a pad link. FIG. 8 is similar to FIG. 7 except for that a data pad DP1 and a data line D1 are formed on a gate insulating film 81.

As shown in FIG. 8, a gate insulating film 81 is on a first substrate 61. A plurality of data lines D1 are formed on the gate insulating film 81 at an active region 'A'. On the gate insulating film 81 in the pad region 'P', there are the data pad DP1 for receiving a data signal from an external driving IC, and a data pad link PL_d for linking the data signal received at the data pad DP1 to the data line D1 at the active region 'A'.

There are a protection film 83 on the entire surface of the first substrate 61, inclusive of the data pad link PL_d and the data pad DP1, a pixel electrode (not shown) on the protection film 83 at the active region 'A', and a transparent conductive film 63 on the protection film 83 at the pad region 'P' connected to the data pad through a connection hole.

A method for fabricating an LCD panel of the present invention will be explained, with reference to FIGS. 9A to 9D. For reference, FIGS. 9A to 9D are cross-sectional views along line VII—VII of FIG. 6 showing a sequential process in fabricating the LCD panel.

Figure 9A:
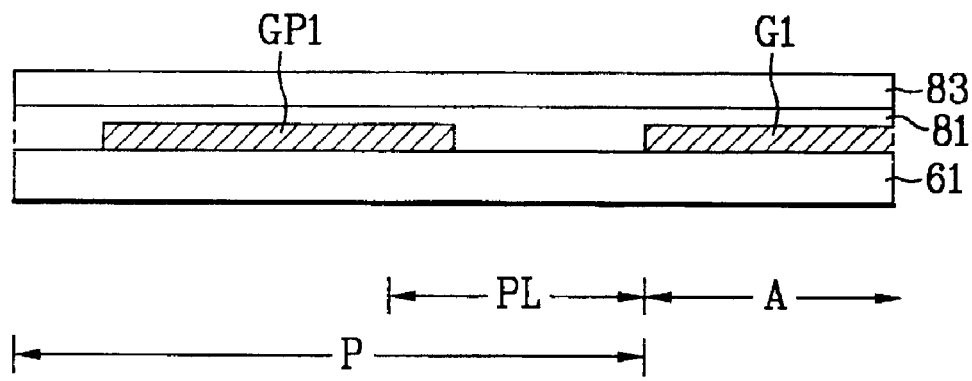
FIGS. 9A to 9D illustrate cross-sectional views showing a fabricating process for an LCD panel according to the present invention.

Referring to FIG. 9A, a plurality of gate lines G1, G2, . . . , Gn are formed of a non-transparent metal on the first substrate 61 at the active region 'A', and a plurality of gate pads GP1, GP2, . . . , GPn are formed of a material the same as the gate lines G1, G2, . . . , Gn in a pad region 'P' except for a pad link part PL.

The gate lines G1, G2, . . . , Gn are formed of a non-transparent metal, such as aluminum (Al), chromium (Cr), molybdenum (Mo), copper (Cu), an aluminum alloy, a bilayer of the foregoing metals, or the like.

A gate insulating film 81 is formed on the entire surface of the first substrate 61 inclusive of the gate pads GP1, GP2, . . . , GPn and the gate lines G1, G2, . . . , Gn, a plurality of data lines (not shown) of a transparent metal the same as the gate lines on the gate insulating film 81 at the active region 'A', and a plurality of data pads (not shown) of a material the same as the data lines at the pad region. There are a semiconductor layer used as a channel of a thin film transistor, and source and drain electrodes on the gate insulating film 81 at the active region 'A'.

Figure 9B:
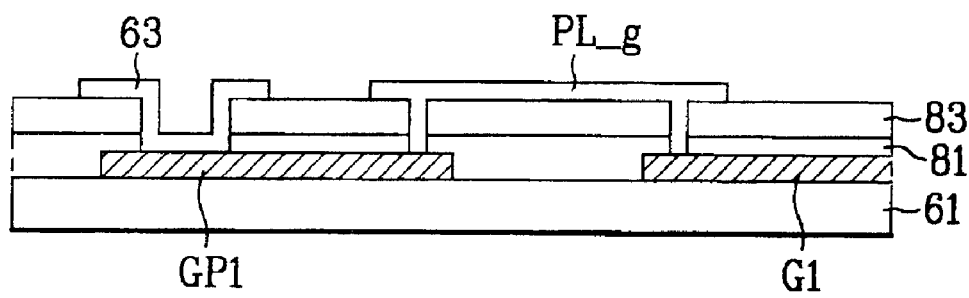

Referring to FIG. 9B, after a protection film 83 is formed on the entire surface of the first substrate 61 inclusive of the data pad and the data line, a transparent conductive film 63 is formed to contact the gate pads GP1, GP2, . . . , GPn through a connection hole of the protection film 83 and the gate insulating film 81. The data pad also passes through the protection film 83 and contacts the transparent conductive film (not shown).

A gate pad link PL_g formed of a transparent conductive material at the pad link part PL passes through the protection film 83 and the gate insulating film 81 and contacts the gate line G1, G2, . . . , Gn to the gate pad GP1, GP2, . . . , GPn, which will be explained, in more detail.

After the protection film 83 is formed, the protection film 83 and the gate insulating film 81 are selectively removed, so that two regions of the gate pads GP1, GP2, . . . , GPn, and a region of the gate lines G1, G2, . . . , Gn adjacent to the pad link part PL are exposed.

One of the exposed regions of the gate pads GP1, GP2, . . . , GPn is connected to a driving IC through the transparent conductive film 63 for connection, and the other is connected to the gate pad link PL_g. The exposed region of the gate lines G1, G2, . . . , Gn is connected to the gate pad link PL_g.

After the protection film 83 and the gate insulating film 81 are selectively removed, a layer of a transparent conductive material, for an example, ITO, is formed on the entire surface inclusive of the protection film 83, and patterned. Thus, the transparent conductive film 63 is connected to the gate pad GP1, GP2, . . . , GPn, and a gate pad link PL_g connecting the gate pad GP1, GP2, . . . , GPn and the gate line G1, G2, . . . , Gn.

Figure 9C:
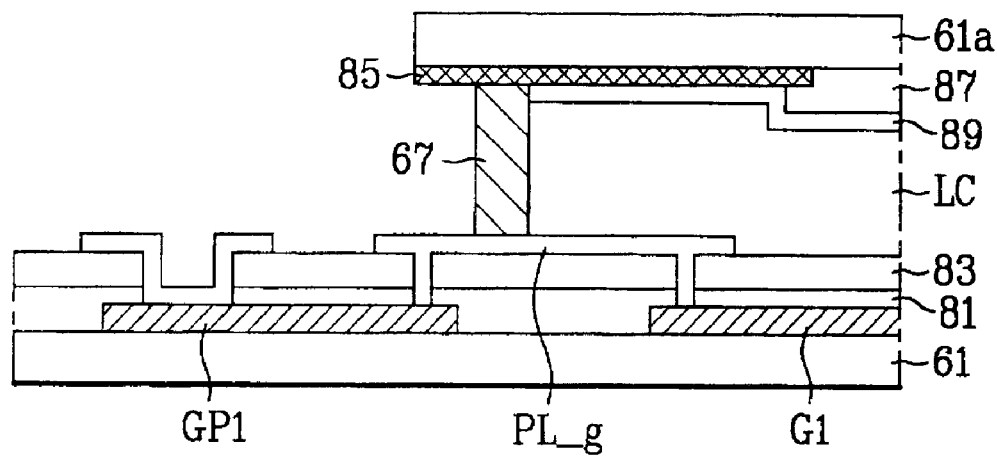

Referring to FIG. 9C, on a second substrate 61a, a light shielding layer 85 and a color filter layer 87 are formed, and a common electrode 89 is formed for applying a voltage to the liquid crystal layer LC with the pixel electrode 71.

Figure 9D:
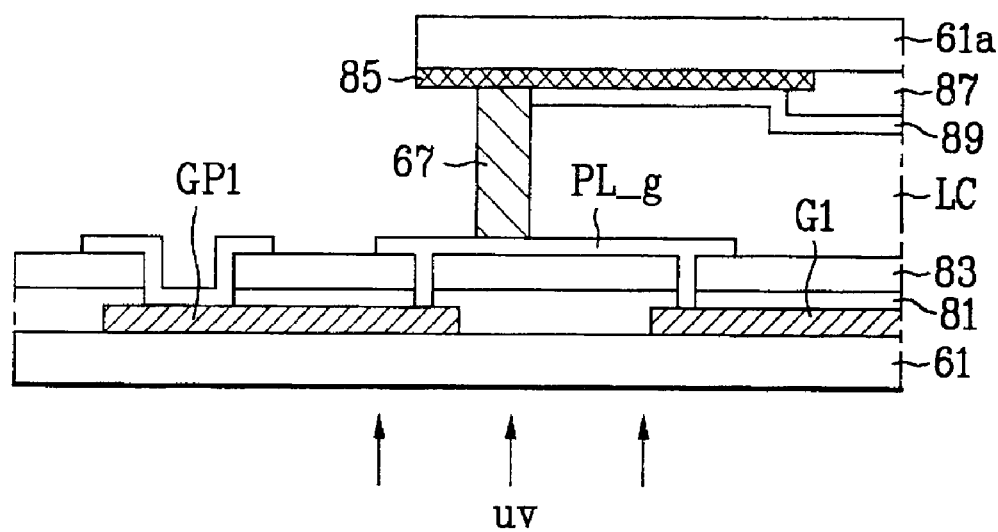

After a photo-hardening sealant 67 is applied to the gate pad link PL_g for bonding the first substrate 61 and the second substrate 61a, the two substrates are bonded. In FIG. 9D, light is directed from the back of the first substrate 61a for curing the photo-hardening sealant 67.

Then, a liquid crystal is injected into the gap between the two substrates through a liquid crystal injection hole (not shown), to complete the process for fabricating an LCD panel of the present invention.

In the present invention, the liquid crystal layer LC is formed by vacuum injection through a liquid crystal injection hole (not shown) after bonding the first substrate 61 and the second substrate 61a with the photo-hardening sealant 67. In addition to the vacuum injection method, a dropping method may be used for forming the liquid crystal layer. That is, after applying the photo-hardening sealant 67 to the first substrate 61 opposite to the pad link part PL, a liquid crystal is spread on the first substrate 61, and the first substrate 61 and the second substrate 61a are bonded. Also, the photo-hardening sealant may be formed on the second substrate and the liquid crystal is dropped on the first substrate. Thus, the photo-hardening sealant and the liquid crystal may be formed on the second substrate.

The dropping method shortens a period of time for forming the liquid crystal layer. Thus, a problem of blot formed around the liquid crystal injection hole is solved because no liquid crystal injection hole is required.

In the meantime, the foregoing embodiment may be applied to a method for thinning a substrate by etching outsides of substrates by dipping in an etching solution after bonding the substrates.

As has been explained, the LCD panel of the present invention permits the light to be incident on the photo-hardening sealant through a transparent conductive material by forming pads and pad links connecting the pads and the wiring of a transparent conductive material that transmits the light. Alternatively, only the portion of the pad links applied with the photo-hardening sealant may be formed of the transparent conductive material.

Accordingly, a product reliability is improved because the photo-hardening sealant is effectively cured, thereby improving bonding of the two substrates without a defective bonding.

Therefore, the photo-hardening sealant is applicable to an LCD panel for a notebook computer in which the gate and the data electrodes at the pad region and the optical shielding layer are allowed to be overlapped. An application of the photo-hardening sealant is also allowable to monitor type models.

Moreover, when the dropping method is employed, the problems of the injection hole gap and the blot around the injection hole is solved, thereby improving a product yield.

It will be apparent to those skilled in the art that various modifications and variations can be made in the LCD panel and the method for fabricating the same of the present invention without departing from the spirit or scope of the inventions. Thus, it is intended that the present invention covers the modifications and variations of this invention provided they come within the scope of the appended claims and their equivalents.

What is claimed is:

1. A method for fabricating a liquid crystal display panel having an active region on a first substrate and first and second pad regions on a second substrate, the method comprising:

forming a plurality of gate lines at the active region and a plurality of gate pads at the first pad region;

forming a plurality of data lines at the active region between the gate lines and the gate pads and a plurality of data pads in the second pad region;

forming a protection film on the first substrate to cover the gate lines, the gate pads, the data lines, and the data pads;

forming a plurality of pad links formed of a transparent conductive material on the protection film to electrically interconnect the gate lines and the gate pads, and the data lines and the data pads; and attaching the first and second substrates.

2. The method of claim 1, further comprising forming a photo-hardening sealant along a circumference of the active region after forming the pad links.

3. The method of claim 1, further comprising injecting a liquid crystal after attaching the first and second substrates.

4. The method of claim 2, further comprising dropping a liquid crystal on the first substrate after forming a photo-hardening sealant.

5. The method of claim 1, further comprising:

forming a gate insulating film on the first substrate;

forming a semiconductor layer on the gate insulating film; and forming source and drain electrodes on the semiconductor layer.

6. The method of claim 5, wherein the source and drain electrodes, the data lines, and the data pads are formed at the same time.

7. The method of claim 5, further comprising:

forming a pixel electrode at the active region.

8. The method of claim 1, further comprising exposing the drain electrode, the gate pad, and the data pad after forming the protection film.

9. The method of claim 8, further comprising forming a transparent conductive film connecting the gate pad and the data pad after exposing the gate and data pads.

10. The method of claim 9, wherein the transparent conductive film and the pad links are formed at the same time.

11. A method for fabricating a liquid crystal display panel having first and second substrates, the method comprising:

forming a plurality of gate lines at an active region and a plurality of gate pads at a first region;

forming a gate insulating film on the first substrate to cover the plurality of gate lines and gate pads;

forming a plurality of data lines on the gate insulating film at the active region and a plurality of data pads on the gate insulating film at a second pad region;

forming a protection film on the gate insulating film, the plurality of data lines, and the plurality of data pads;

forming a plurality of pad links formed of a transparent conductive material on the protection film to electrically interconnect end portions of the gate lines and the gate pads, and to electrically interconnect end portions of the data lines and the data pads; and attaching the first and second substrates.

12. The method of claim 11, further comprising forming a photo-hardening sealant along a circumference of the active region after forming the pad links.

13. The method of claim 12, further comprising dropping a liquid crystal on the first substrate after forming the photo-hardening sealant.

14. The method of claim 11, further comprising injecting a liquid crystal after attaching the first and second substrates.

15. The method of claim 11, further comprising:

forming a semiconductor layer on the gate insulating film; and forming source and drain electrodes on the semiconductor layer.

16. The method of claim 15, wherein the source and drain electrodes, the data lines, and the data pads are formed at the same time.

17. The method of claim 11, further comprising forming pixel electrodes at the active region.

18. The method of claim 11, further comprising exposing the drain electrode, the gate pad, and the data pad after forming the protection film.

19. The method of claim 18, further comprising forming a transparent conductive film electrically interconnecting the gate pad and the data pad after exposing the gate and data pads.

20. The method of claim 19, wherein the transparent conductive film and the pad links are formed at the same time.

21. The method of claim 11, further comprising removing portions of the protection film and gate insulating film to expose the end portions of the gate lines and the gate pads.

22. The method of claim 11, further comprising removing portions of the protection film to expose the end portions of the data lines and the data pads.

* * * * *